US006843563B2

(12) United States Patent
Richardson (10) Patent No.: US 6,843,563 B2
(45) Date of Patent: Jan. 18, 2005

(54) SMOOTHLY BLENDED OPTICAL SURFACES (75) Inventor: Gary A. Richardson, Rochester, NY (US)

(73) Assignee: Bausch and Lomb, Inc., Rochester, NY (US)

( * ) Notice: Subject to any disclaimer, the term of this patent is extended or adjusted under 35 U.S.C. 154(b) by 0 days.

(21) Appl. No.: 10/210,708

(22) Filed: Jul. 31, 2002

(65) Prior Publication Data

US 2004/0021825 A1 Feb. 5, 2004

(51) Int. Cl.[7] .............................................. G02C 7/04
(52) U.S. Cl. .................................. 351/160 R; 351/177
(58) Field of Search ......................... 351/160 R, 161, 351/160 H, 162, 177; 451/42–3, 240, 255–6, 277, 323, 325, 2.7, 390; 264/2.7

(56) References Cited

U.S. PATENT DOCUMENTS

| 5,452,031 | A |   | 9/1995  | Ducharme ............... 351/177   |
| 5,650,838 | A |   | 7/1997  | Roffman ................. 351/177   |
| 5,880,809 | A | * | 3/1999  | Lieberman et al. ..... 351/160 R  |
| 6,030,077 | A | * | 2/2000  | Sawano et al. ........... 351/161  |
| 6,241,355 | B1 |  | 6/2001  | Barsky ................... 351/177   |
| 6,244,709 | B1 | * | 6/2001 | Vayntraub et al. ......... 351/161 |
| 6,366,823 | B1 |  | 4/2002  | Shirayanagi .............. 700/97   |
| 6,659,607 | B2 | * | 12/2003 | Miyamura et al. ...... 351/160 R |
| 2002/0101563 | A1 | * | 8/2002 | Miyamura et al. ...... 351/160 R |
| 2003/0199976 | A1 | * | 10/2003 | Portney .................... 623/6.17 |
| 2004/0021824 | A1 | * | 2/2004 | Ye et al. ................... 351/161  |

FOREIGN PATENT DOCUMENTS

| EP | 0742462 A2   | 11/1996 | ............ G02C/7/04 |
| WO | WO 00/54094 | 9/2000  | ............ G02C/7/04 |

* cited by examiner

Primary Examiner—Jordan M. Schwartz
Assistant Examiner—Jessica Stultz
(74) Attorney, Agent, or Firm—William J. Greener (57) ABSTRACT Apparatus, products, and methods are described that relate to blending various disparate optical surfaces in a smooth and continuous manner. In cross section, the two disparate surfaces are represented as meridional profiles. A blend zone profile is described by a single third-order polynomial. In the case of rotationally symmetric optics, one cross-section suffices for the description of the entire surface. In the case of non-rotationally symmetric optics, an increased number of cross-sections are necessary to produce the desired three-dimensional surface, thus meridional profiles are calculated at selected azimuthal locations to describe the full surface.

15 Claims, 4 Drawing Sheets

SMOOTHLY BLENDED OPTICAL SURFACES

BACKGROUND OF THE INVENTION

1. Field of the Invention

The invention is generally directed to the field of optical design of a lens surface and ophthalmic lens manufacture, and more specifically to blending disparate optical surfaces smoothly and continuously in an optical lens.

2. Description of Related Art

Contact lenses have been around for many years. Lens surfaces that were once limited to simple spherical profiles have given way to surface shapes that are now limited only by the ability to physically impart a surface topology described by any of a variety of complex mathematical expressions. Over the last ten years or so, toric surfaces have been put on contact lenses for the correction of astigmatism. Multifocal lenses have surfaces with various power zones for near, intermediate, and far distance viewing, while some contact lenses rely on Fresnel zones or diffractive effects for guiding light through the lens.

Wavefront sensors now routinely allow doctors to measure higher order aberrations of the eye with the intent of providing customized vision correction through lenses (contact types, IOLs, inlays, onlays, etc.) or refractive surgery resulting, ideally, in vision quality well beyond what has been achievable in the past. In order to correct these higher order aberrations, however, the optical surface of a contact lens, for example, will be non-rotationally symmetric. Every measured meridian will likely have a unique cross sectional profile.

A lens having a plurality of regions, each with distinct optical behavior, must incorporate zones which blend one region to the next. In cases where non-rotationally symmetric regions must be joined to other rotationally or non-rotationally symmetric regions, algorithms are required to calculate smooth and continuous blending zones.

One of the current methods employed in the manufacture of an optical surface involves describing the surface with a series of two-dimensional cross-sections. In the case of rotationally symmetric optics, one cross-section will suffice for this description. In the case of non-rotationally symmetric optics, multiple cross-sections are necessary to describe the desired three-dimensional surface. Alternatively, complicated mathematical techniques and associated computer power are required for complex surface shapes such as those of custom contact lenses, for example.

Figure 1A:
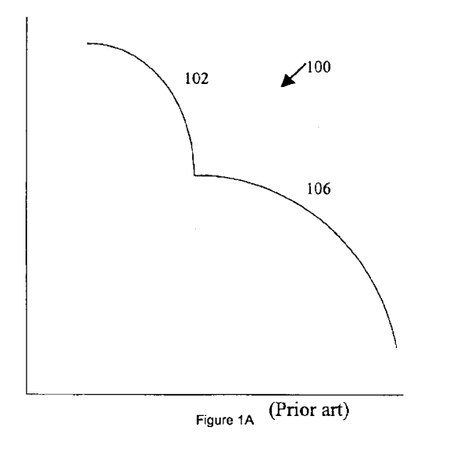
FIG. 1A is a line drawing showing a typical rotationally symmetric lens surface cross section having two elements that must be blended one to another in order to allow machining of the lens surface.
Figure 1B:
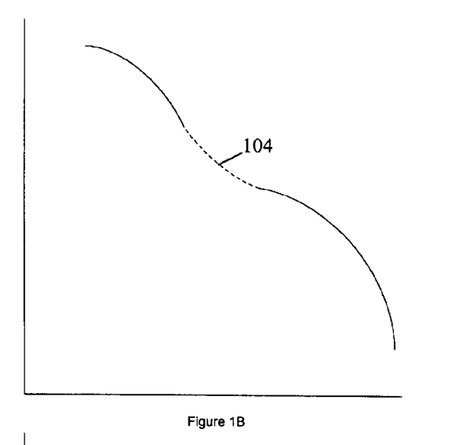
FIG. 1B is a line drawing showing a simple arc used to smoothly connect the two elements shown in FIG. 1A.
Figure 2A:
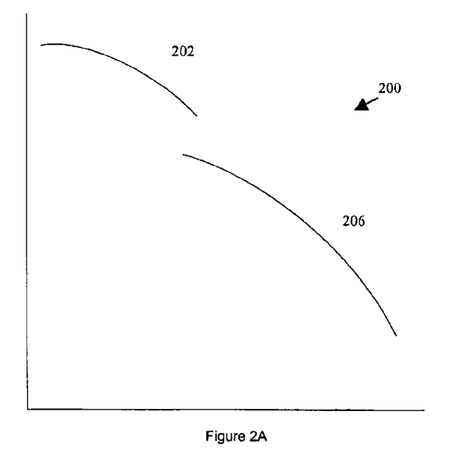
FIG. 2A is a line drawing showing a two-element cross-sectional profile typical of what might be found in a non rotationally-symmetric lens surface.
Figure 2B:
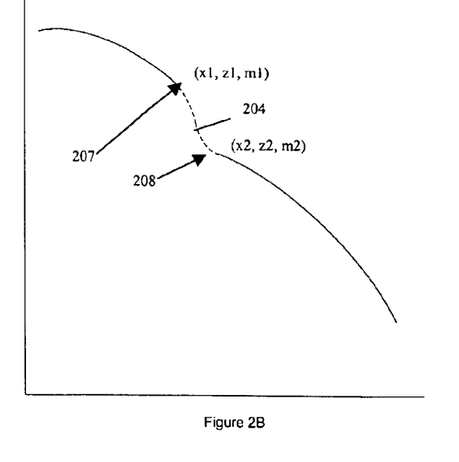
FIG. 2B is a line drawing showing that a simple arc cannot be used to smoothly connect the two elements shown in FIG. 2A.

FIG. 1A shows a typical meridional cross-section 100 of a lens surface comprising two elements 102, 106 that must be blended one to another in order to allow machining of the lens surface. In this case, a simple arc 104 can be used to join the first and second segments as displayed in FIG. 1B (as is traditionally the practice). FIG. 2A shows a cross-section 200 typical of what might be found in a non-rotationally symmetric surface. FIG. 2B demonstrates that a simple arc cannot be used to make such a cross-section smooth and continuous. In this case, a more complicated, higher order algorithm is required.

U.S. Pat. No. 5,452,031 to Ducharme describes the use of piece-wise polynomials in the form of splines that are used to connect points (or knots) to define a smooth cross-sectional surface profile. Although the Ducharme patent is not expressly limited to rotationally symmetric surfaces, the practical application may be so limited. Furthermore, Ducharme's spline surfaces do not describe the optics of the lens. Roffman et al. U.S. Pat. No. 5,650,838) describes a method for programming smooth junctions between adjacent regions of a lens which have different thickness or radii of curvature. Roffman et al. relies on piece-wise linear functions or combinations of spherical and aspherical conic equations, and requires that the junction pass through a mid-point of the two disparate sections as shown in FIG. 2 of that patent. It is not clear how the Roffman et al. approach can be applied to toric lens surfaces. Barsky (U.S. Pat. No. 6,241,355) describes a method of computer-aided contact lens design and fabrication using spline-based mathematical surfaces. Barsky's high order mathematical techniques are described therein as being applicable for designing lens topology and optics.

In view of the foregoing, the inventor has recognized a need for a flexible algorithm that can be applied to virtually any two generic surfaces, and, particularly to non-rotationally symmetric surfaces, to produce a smooth and continuous blend, and for a more simplified approach than those offered by current and past techniques, requiring a minimal amount of computing time to determine the smooth and continuous blend surface, and which can be implemented in a numerically controlled machine or other optical surface processing apparatus.

SUMMARY OF THE INVENTION

The invention broadly relates to the smooth and continuous joining of disparate surface sections of a non-rotationally symmetric optical surface as encountered, for example, in the surface of a contact lens for correcting lower-order and higher-order aberrations of the eye. This type of lens will be referred to herein as a custom contact lens. The invention, however, is not limited to a custom contact lens surface; rather, it is applicable to the joinder of essentially any two disparate surfaces, including, for example, spherical, aspherical, astigmatic, complex Zernike surfaces, etc. The joining portion, or blend zone as it will be referred to herein, consists of a single third-order polynomial representation for each selected meridian of the surface.

In one embodiment, a contact lens has a non-rotationally symmetric surface. Each meridional cross section of the surface has at least two radially adjacent zones that have disparate profiles, and a blend zone smoothly and continuously joining the at least two radially adjacent zones, in which the blend zone profile is described by a single third-order polynomial. The entire surface of the lens can be expressed as a plurality of separate, meridional cross sectional profiles at selected azimuths between zero-360 degrees.

Another embodiment according to the invention is directed to a device readable medium containing an executable instruction for instructing an appropriate device to make a smooth and continuous blend zone surface profile between a first cross sectional surface profile of a rotationally non-symmetric surface and a radially adjacent, disparate, second cross sectional surface profile of the rotationally non-symmetric surface, wherein the blend zone surface profile is defined by a single third-order polynomial. The instruction can be directed to instructing the device to make the entire surface by creating separate blend zone profiles for a plurality of azimuthally adjacent cross sectional profiles over a full 360 degree range.

In a related embodiment, a system is described for creating a blended, non-rotationally symmetric surface in an optical component, utilizing the medium and instruction referred to above.

Another embodiment of the invention is directed to a design method for a non-rotationally symmetric lens surface wherein a blend zone joining two radially adjacent disparate zones on the surface is defined by a single third-order polynomial.

The invention is thus advantageous in that a complex three-dimensional surface can be represented by a plurality of simple two-dimensional cross sectional profiles. Surface accuracy can be controlled by sampling greater or fewer azimuthal profiles. Therefore, in blending non-rotationally symmetric surfaces to rotationally symmetric surfaces, for example, each cross-section may be addressed individually. Such an approach eliminates the difficult three-dimensional mathematics that would be required otherwise. Thus, the true blending surface will be a result of the many blends that are applied in each meridional cross-section; it will not exist as an explicit geometric entity in and of itself Furthermore, the invention is applicable to the smooth and continuous blending of multiple generic surfaces. According to the invention, minimal computing time is required to obtain a unique solution for each blending surface, eliminating iterations and numerical techniques.

These and other advantages and objects of the present invention will become more readily apparent from the detailed description to follow. However, it should be understood that the detailed description and specific examples, while indicating the preferred embodiments of the invention, are given by way of illustration only, since various changes and modifications within the spirit and scope of the invention will become apparent to those skilled in the art based upon the description and drawings herein and the appended claims.

DETAILED DESCRIPTION OF A PREFERRED EMBODIMENT

Figure 3:
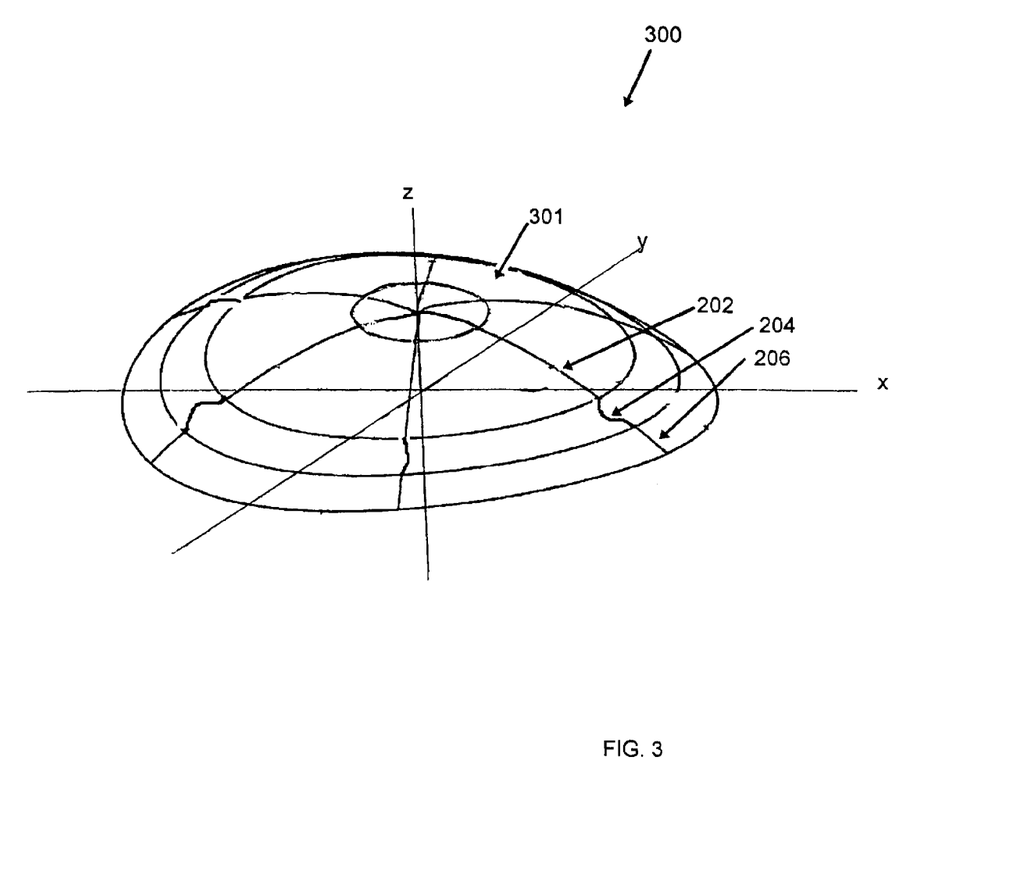
FIG. 3 is a perspective line drawing of a contact lens surface according to an embodiment of the invention.

With reference to FIGS. 2A, 2B, and 3, an embodiment of the invention is directed to an optical lens and, preferably, to an ophthalmic custom contact lens 300 for vision correction, in which the anterior and/or posterior surface of the lens is ultimately a non-rotationally symmetric surface 301. FIG. 2A illustrates a meridional cross sectional profile 200 of two disparately shaped, radially adjacent zones 202, 206 that must be incorporated into the surface 301 of the lens. As shown in FIG. 2B, dotted line 204 represents the cross sectional profile of a blend zone 204 that smoothly and continuously joins disparate zones 202 and 206. According to the invention, the blend zone profile 204 is defined by a single third-order polynomial expressed by equation (1) as follows:

$$z(x) = a_1 + a_2 \cdot x + a_3 \cdot x^2 + a_4 \cdot x^3 \quad (1)$$

where $z(x)$ is the sag of the blend profile. It is expected that the geometry of each of the zone profiles 202, 206 is quantitatively known, thus the end point $x_1$, the sag value $z_1$, and the slope $m_1(x_1,z_1)$ of zone 202, and the start point $x_2$, the sag value $z_2$, and the slope $m_2(x_2,z_2)$ of zone 206, are known or readily determinable quantities. Equation (1) can then be solved for the coefficients $a_1$, $a_2$, $a_3$, $a_4$ such that $z(x)$ will define a smooth and continuous path 204 between the endpoint 207 of the first segment $(x_1,z_1)$ and the start point 208 of the second segment $(x_2,z_2)$. Various numerical techniques can be used to approximate the solution, or, preferably, a commercially available software package such as MathCAD may be utilized. The following explicit solution for the unknown coefficients, $a_n$, is:

$$a_1 = \frac{z_1 \cdot x_2^3 - x_1 \cdot x_2^3 \cdot m_1 - x_2^2 \cdot m_2 \cdot x_1^2 - 3 \cdot z_1 \cdot x_2^2 \cdot x_1 + x_1^2 \cdot x_2^2 \cdot m_1 + 3 \cdot z_2 \cdot x_2 \cdot x_1^2 + x_2 \cdot m_2 \cdot x_1^3 - z_2 \cdot x_1^3}{x_2^3 - 3 \cdot x_1 \cdot x_2^2 + 3 \cdot x_2 \cdot x_1^2 - x_1^3}$$

$$a_2 = \frac{x_2^3 \cdot m_1 + x_2^2 \cdot x_1 \cdot m_1 + 2 \cdot x_2^2 \cdot m_2 \cdot x_1 - m_2 \cdot x_2 \cdot x_1^2 - 2 \cdot x_1^2 \cdot x_2 \cdot m_1 - 6 \cdot z_2 \cdot x_2 \cdot x_1 + 6 \cdot x_2 \cdot z_2 \cdot x_1 - m_2 \cdot x_1^3}{x_2^3 - 3 \cdot x_1 \cdot x_2^2 + 3 \cdot x_2 \cdot x_1^2 - x_1^3}$$

$$a_3 = \frac{-2 \cdot x_2^2 \cdot m_1 + x_2^2 \cdot m_2 + 3 \cdot z_2 \cdot x_2 - 3 \cdot z_1 \cdot x_2 + x_1 \cdot x_2 \cdot m_1 - x_2 \cdot m_2 \cdot x_1 + 2 \cdot x_1^2 \cdot m_2 + 3 \cdot z_2 \cdot x_1 - 3 \cdot z_1 \cdot x_1 + x_1^2 \cdot m_1}{(x_2 - x_1) \cdot (x_2^2 - 2 \cdot x_1 \cdot x_2 + x_1^2)}$$

$$a_4 = \frac{x_2 \cdot m_1 + x_2 \cdot m_2 + 2 \cdot z_1 - x_1 \cdot m_2 - x_1 \cdot m_1 - 2 \cdot z_2}{x_2^3 - 3 \cdot x_1 \cdot x_2^2 + 3 \cdot x_2 \cdot x_1^2 - x_1^3}.$$

While equation (1) provides for a smooth and continuous meridional blend zone cross sectional profile, it will be appreciated that the total blending surface will be the result of numerous azimuthally adjacent blend profiles that are applied in each cross-section to create the surface 301 illustrated in FIG. 3. In a preferred aspect, the lens surface has 24 adjacent blend zones spaced every 15 degrees. It will also be apparent that more than two disparate radial zones may be necessary to describe a complete surface section. In that case, any number of zones are joined as described above.

Figure 4:
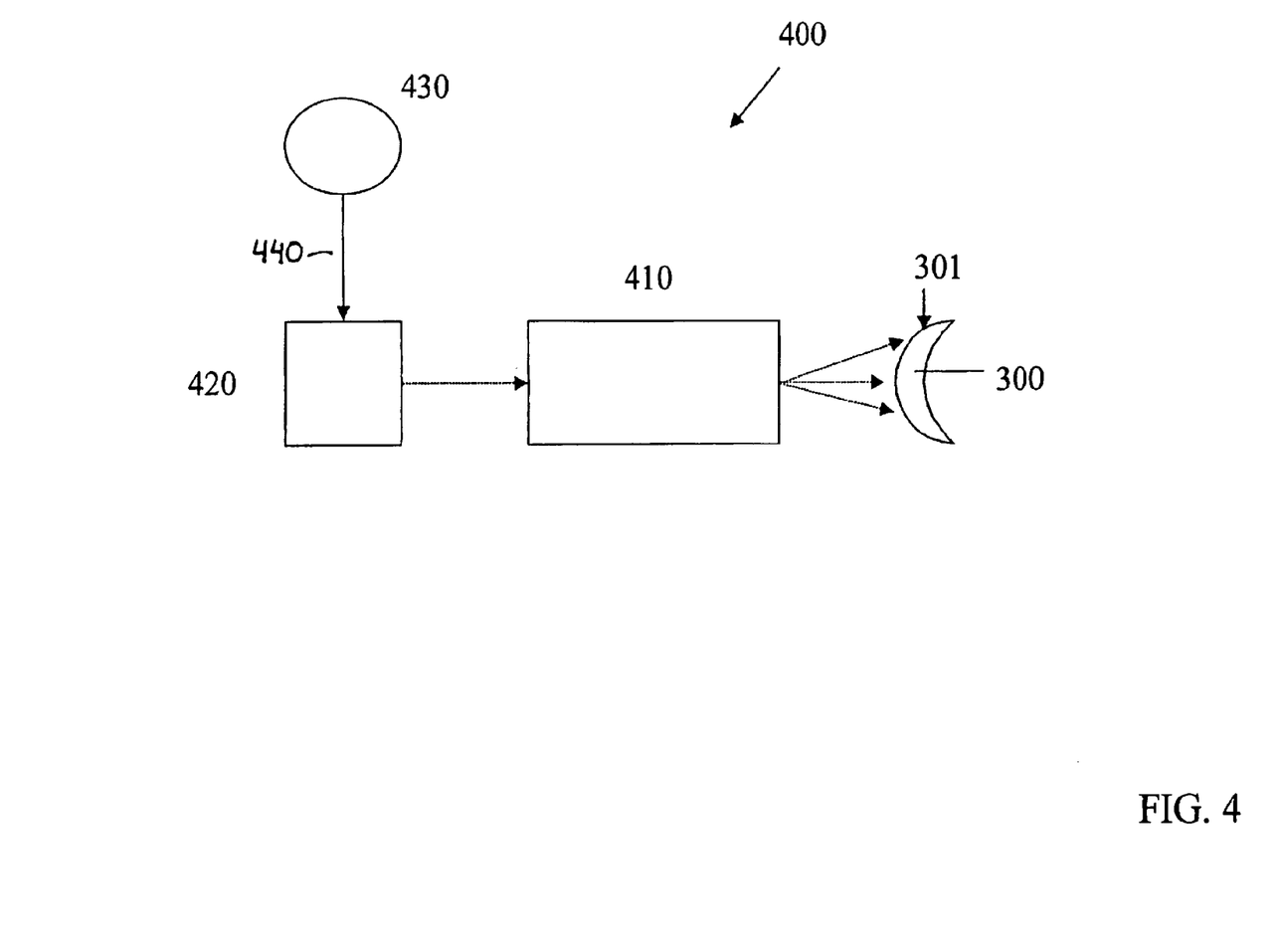
FIG. 4 is a block diagram of a system embodiment of the invention.

Another embodiment of the invention is directed to a readable medium 430 (FIG. 4) in the form of, e.g., a carrier wave or other data/instruction transmitting electromagnetic form, a computer readable medium such as a disk, CD, DVD, for example, or other form, or any other suitable media that can be input to an appropriate device or system, and which can carry a coded or uncoded instruction 440 that is executable by the device or system. The instruction, upon execution, provides information to the device for making a smooth and continuous blend zone surface between a first zone surface and a radially adjacent, disparate, second zone surface in an optical lens to create a smooth, non-rotationally symmetric optical surface. The instruction defines the blend zone surface by a plurality of separate, azimuthally adjacent blend zones each of which has a meridional cross sectional profile defined by a single third-order polynomial of the form $$z(x) = a_1 + a_2 \cdot x + a_3 \cdot x^2 + a_4 \cdot x^3,$$

where $z(x)$ is a sag value over the blend zone profile. The instruction is directly or indirectly based upon a solution of the third-order polynomial which is facilitated by solving for the coefficients, $a_n$, as follows:

$$a_1 = \frac{z_1 \cdot x_2^3 - x_1 \cdot x_2^3 \cdot m_1 - x_2^2 \cdot m_2 \cdot x_1^2 - 3 \cdot z_1 \cdot x_2^2 \cdot x_1 + x_1^2 \cdot x_2^2 \cdot m_1 + 3 \cdot z_2 \cdot x_2 \cdot x_1^2 + x_2 \cdot m_2 \cdot x_1^3 - z_2 \cdot x_1^3}{x_2^3 - 3 \cdot x_1 \cdot x_2^2 + 3 \cdot x_2 \cdot x_1^2 - x_1^3}$$

$$a_2 = \frac{x_2^3 \cdot m_1 + x_2^2 \cdot x_1 \cdot m_1 + 2 \cdot x_2^2 \cdot m_2 \cdot x_1 - m_2 \cdot x_2 \cdot x_1^2 - 2 \cdot x_1^2 \cdot x_2 \cdot m_1 - 6 \cdot z_2 \cdot x_2 \cdot x_1 + 6 \cdot x_2 \cdot z_2 \cdot x_1 - m_2 \cdot x_1^3}{x_2^3 - 3 \cdot x_1 \cdot x_2^2 + 3 \cdot x_2 \cdot x_1^2 - x_1^3}$$

$$a_3 = \frac{-2 \cdot x_2^2 \cdot m_1 - x_2^2 \cdot m_2 + 3 \cdot z_2 \cdot x_2 - 3 \cdot z_1 \cdot x_2 + x_1 \cdot x_2 \cdot m_1 - x_2 \cdot m_2 \cdot x_1 + 2 \cdot x_1^2 \cdot m_2 + 3 \cdot z_2 \cdot x_1 - 3 \cdot z_1 \cdot x_1 + x_1^2 \cdot m_1}{(x_2 - x_1) \cdot (x_2^2 - 2 \cdot x_1 \cdot x_2 + x_1^2)}$$

$$a_4 = \frac{x_2 \cdot m_1 + x_2 \cdot m_2 + 2 \cdot z_1 - x_1 \cdot m_2 - x_1 \cdot m_1 - 2 \cdot z_2}{x_2^3 - 3 \cdot x_1 \cdot x_2^2 + 3 \cdot x_2 \cdot x_1^2 - x_1^3},$$

where ($x_1$, $z_1$) and ($x_2$, $z_2$) are the endpoint coordinates and start point coordinates, respectively, of a first meridional cross sectional surface profile and a second meridional cross sectional surface profile representative of the first zone surface and the radially adjacent, disparate, second zone surface, and $m_1$ and $m_2$ are slope data at ($x_1$, $z_1$) and ($x_2$, $z_2$).

In a related embodiment, a system 400 is illustrated in FIG. 4 for making a non-rotationally symmetric surface 301 on a custom contact lens 300 intended to provide an optical aberration correction. The system 400 includes a device 410 such as, for example, a lathe or laser that can operate on the lens to alter the surface in a controlled manner. In a preferred embodiment, the device will be a numerically controlled lathe such as an Optoform® with Variform® oscillating tool multi-axis lathe (Precitech, Keene, N.H., USA), or a laser suitable for ablating the surface of an ophthalmic lens; for example an ArF excimer laser having a 193 nm output wavelength. As shown, a control system 420 (e.g., a P.C.) is operatively associated with the device 410 and is capable to receive the medium 430 as described above that includes the instruction 440 that drives the device. The instruction 440 instructs the device 410 to make a smooth and continuous blend zone surface profile 204 between a first cross sectional surface profile 202 of the non-rotationally symmetric surface 301 and a radially adjacent, disparate, second cross sectional surface profile 206 of the non-rotationally symmetric surface, wherein the blend zone surface profile 204 is defined by a single third-order polynomial of the form $z(x) = a_1 + a_2 \cdot x + a_3 \cdot x^2 + a_4 \cdot x^3$. $Z(x)$ is a sag value over the blend zone. The exact solution to the equation is facilitated by solving for the unknown coefficients, $a_n$, as set forth hereinabove.

Figure 5:
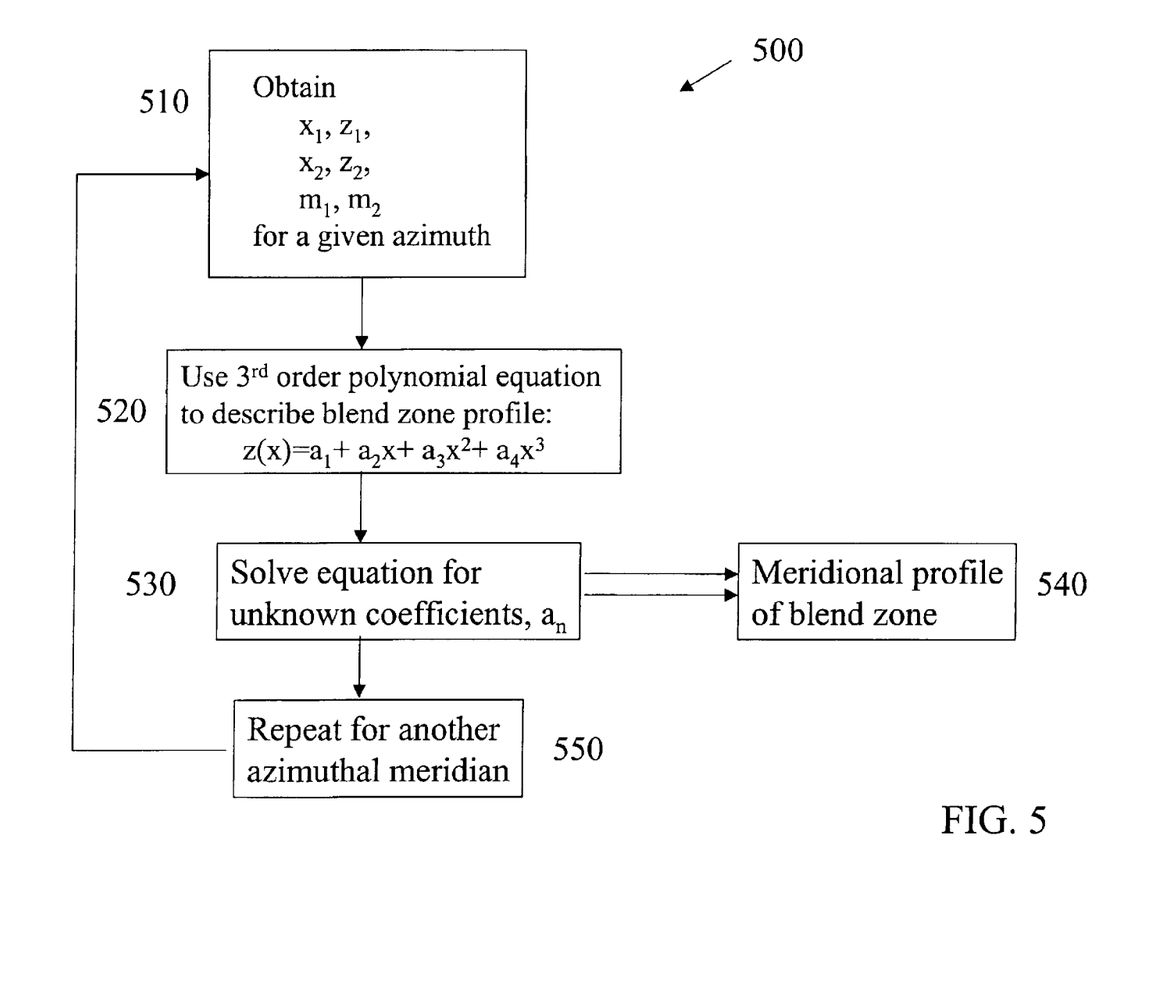
FIG. 5 is a flow process diagram illustrating a design method according to an embodiment of the invention.

The invention is also embodied as a design method for a non-rotationally symmetric surface of an aberration correcting lens that requires joining at least two radially adjacent, disparate zones to form a smooth and continuous surface. FIG. 5 illustrates a series of process steps 500 according to the invention. For simplicity, the method will be described for joining only two disparate radial zones as the identical methodology is used for joining more than two zones. Since the geometries of the two disparate zone profiles are quantitatively known from aberration measurements or other means, the end point $x_1$, the sag value $z_1$, and the slope $m_1(x_1,z_1)$ of a first zone, and the start point $x_2$, the sag value $z_2$, and the slope $m_2(x_2,z_2)$ of the adjoining zone can be easily obtained at step 510. A third-order polynomial expressed by $z(x) = a_1 + a_2 \cdot x^2 + a_3 \cdot x + a_4 \cdot x^3$ is then used to describe the blend zone profile for a selected meridian at 520. The equation can be solved for the coefficients $a_1$, $a_2$, $a_3$, $a_4$ at 530, and $z(x)$ will define a smooth and continuous profile between the endpoint of the first segment and the start point of the second segment at 540. Various numerical techniques can be used to approximate the solution, or, preferably, a commercially available software package such as MathCAD can be utilized to obtain an exact solution as follows:

$$a_1 = \frac{z_1 \cdot x_2^3 - x_1 \cdot x_2^3 \cdot m_1 - x_2^2 \cdot m_2 \cdot x_1^2 - 3 \cdot z_1 \cdot x_2^2 \cdot x_1 + x_1^2 \cdot x_2^2 \cdot m_1 + 3 \cdot z_2 \cdot x_2 \cdot x_1^2 + x_2 \cdot m_2 \cdot x_1^3 - z_2 \cdot x_1^3}{x_2^3 - 3 \cdot x_1 \cdot x_2^2 + 3 \cdot x_2 \cdot x_1^2 - x_1^3}$$

$$a_2 = \frac{x_2^3 \cdot m_1 + x_2^2 \cdot x_1 \cdot m_1 + 2 \cdot x_2^2 \cdot m_2 \cdot x_1 - m_2 \cdot x_2 \cdot x_1^2 - 2 \cdot x_1^2 \cdot x_2 \cdot m_1 - 6 \cdot z_2 \cdot x_2 \cdot x_1 + 6 \cdot x_2 \cdot z_2 \cdot x_1 - m_2 \cdot x_1^3}{x_2^3 - 3 \cdot x_1 \cdot x_2^2 + 3 \cdot x_2 \cdot x_1^2 - x_1^3}$$

$$a_3 = \frac{-2 \cdot x_2^2 \cdot m_1 + x_2^2 \cdot m_2 + 3 \cdot z_2 \cdot x_2 - 3 \cdot z_1 \cdot x_2 + x_1 \cdot x_2 \cdot m_1 - x_2 \cdot m_2 \cdot x_1 + 2 \cdot x_1^2 \cdot m_2 + 3 \cdot z_2 \cdot x_1 - 3 \cdot z_1 \cdot x_1 + x_1^2 \cdot m_1}{(x_2 - x_1) \cdot (x_2^2 - 2 \cdot x_1 \cdot x_2 + x_1^2)}$$

$$a_4 = \frac{x_2 \cdot m_1 + x_2 \cdot m_2 + 2 \cdot z_1 - x_1 \cdot m_2 - x_1 \cdot m_1 - 2 \cdot z_2}{x_2^3 - 3 \cdot x_1 \cdot x_2^2 + 3 \cdot x_2 \cdot x_1^2 - x_1^3}.$$

The total blending surface can be obtained by repeating the process at 550 for an azimuthally adjacent location until a full 360 degree surface is achieved. In a preferred aspect, the lens surface has 24 adjacent blend zones spaced every 15 degrees.

While various advantageous embodiments have been chosen to illustrate the invention, it will be understood by those skilled in the art that changes and modifications can be made therein without departing from the scope of the invention as defined in the appended claims.

I claim:

1. A contact lens having an anterior surface and a posterior surface, wherein at least one of the surfaces is non-rotationally symmetric, further wherein the non-rotationally symmetric surface has a plurality of disparately shaped, radially adjacent zones, comprising:

a conjoining blend zone having a cross sectional profile defined by a single third-order polynomial.

2. The contact lens of claim 1, wherein the non-rotationally symmetric surface further comprises a plurality of azimuthally adjacent blend zones to describe a full blend zone surface.

3. The contact lens of claim 2, comprising a total of 24 blend zones spaced every 15 degrees to describe a full 360 degree blend zone surface.

4. A contact lens having a cross sectional surface profile including a first zone profile and a disparate, second zone profile radially adjacent the first zone profile, comprising a non-correctible blend zone profile that smoothly and continuously joins the first and second zone profiles, wherein the blend zone profile is defined by a single third-order polynomial.

5. The contact lens of claim 4, comprising a plurality of azimuthally adjacent blend zone profiles to describe a full blend zone surface.

6. The contact lens of claim 5, comprising 24 blend zone profiles azimuthally spaced in 15 degree increments over a 360 degree surface.

7. A readable medium including a device executable instruction for making, by the device, a smooth and continuous blend zone surface between a first zone surface and a radially adjacent, disparate, second zone surface in an optical lens, to create a smooth, non-rotationally symmetric optical surface, wherein the instruction defines the blend zone surface by a plurality of separate, azimuthally adjacent blend zones each of which has a meridional cross sectional profile defined by a single third-order polynomial of the form $$z(x)=a_1+a_2\cdot x+a_3\cdot x^2+a_4\cdot x^3,$$

where $z(x)$ is a sag value over the blend zone profile.

8. The medium of claim 7, wherein a solution to the equation $z(x)$ for the coefficients $a_n$ takes the following form:

$$a_1 = \frac{z_1 \cdot x_2^3 - x_1 \cdot x_2^3 \cdot m_1 - x_2^2 \cdot m_2 \cdot x_1^2 - 3 \cdot z_1 \cdot x_2^2 \cdot x_1 + x_1^2 \cdot x_2^2 \cdot m_1 + 3 \cdot z_2 \cdot x_2 \cdot x_1^2 + x_2 \cdot m_2 \cdot x_1^3 - z_2 \cdot x_1^3}{x_2^3 - 3 \cdot x_1 \cdot x_2^2 + 3 \cdot x_2 \cdot x_1^2 - x_1^3}$$

$$a_2 = \frac{x_2^3 \cdot m_1 + x_2^2 \cdot x_1 \cdot m_1 + 2 \cdot x_2^2 \cdot m_2 \cdot x_1 - m_2 \cdot x_2 \cdot x_1^2 - 2 \cdot x_1^2 \cdot x_2 \cdot m_1 - 6 \cdot z_2 \cdot x_2 \cdot x_1 + 6 \cdot x_2 \cdot z_2 \cdot x_1 - m_2 \cdot x_1^3}{x_2^3 - 3 \cdot x_1 \cdot x_2^2 + 3 \cdot x_2 \cdot x_1^2 - x_1^3}$$

$$a_3 = \frac{-2 \cdot x_2^2 \cdot m_1 - x_2^2 \cdot m_2 + 3 \cdot z_2 \cdot x_2 - 3 \cdot z_1 \cdot x_2 + x_1 \cdot x_2 \cdot m_1 - x_2 \cdot m_2 \cdot x_1 + 2 \cdot x_1^2 \cdot m_2 + 3 \cdot z_2 \cdot x_1 - 3 \cdot z_1 \cdot x_1 + x_1^2 \cdot m_1}{(x_2 - x_1) \cdot (x_2^2 - 2 \cdot x_1 \cdot x_2 + x_1^2)}$$

$$a_4 = \frac{x_2 \cdot m_1 + x_2 \cdot m_2 + 2 \cdot z_1 - x_1 \cdot m_2 - x_1 \cdot m_1 - 2 \cdot z_2}{x_2^3 - 3 \cdot x_1 \cdot x_2^2 + 3 \cdot x_2 \cdot x_1^2 - x_1^3},$$

where $(x_1, z_1)$ and $(x_2, z_2)$ are the endpoint coordinates and start point coordinates, respectively, of a first meridional cross sectional surface zone profile and a second meridional cross sectional surface zone profile, representative of the first zone surface and the radially adjacent, disparate, second zone surface, and $m_1$ and $m_2$ are slope data at $(x_1, z_1)$ and $(x_2, z_2)$.

9. The medium of claim 7, wherein the device is at least one of a numerically controlled, multi-axis lathe and a laser.

10. A method for designing a non-rotationally symmetric surface for an aberration correcting lens that requires joining at least two radially adjacent, disparate zones to form a smooth and continuous surface, comprising:

determining a smooth and continuous blend path between the at least two zones, wherein the blend path has a meridional cross sectional profile defined by a single third-order polynomial of the form $$z(x)=a_1+a_2\cdot x+a_3\cdot x^2+a_4\cdot x^3,$$

where $z(x)$ is a sag value over the blend zone profile.

11. The method of claim 10, further comprising:

a) obtaining values for $x_1$, $z_1$, $x_2$, $z_2$, and $m_1$, $m_2$ for a selected meridian, where $(x_1, z_1)$ and $(x_2, z_2)$ are the endpoint coordinates and start point coordinates, respectively, of the first meridional cross sectional surface zone profile and the second meridional cross sectional surface zone profile, representative of the first zone surface and the radially adjacent, disparate, second zone surface, and $m_1$ and $m_2$ are slope data at $(x_1, z_1)$ and $(x_2, z_2)$;

b) solving the polynomial equation for the unknown coefficients $a_n$ to determine the meridional cross sectional blend zone profile; and c) repeating steps (a) and (b) for a different selected meridian.

12. The method of claim 11, wherein a solution for $a_1$, $a_2$, $a_3$, $a_4$ has the form $$a_1 = \frac{z_1 \cdot x_2^3 - x_1 \cdot x_2^3 \cdot m_1 - x_2^2 \cdot m_2 \cdot x_1^2 - 3 \cdot z_1 \cdot x_2^2 \cdot x_1 + x_1^2 \cdot x_2^2 \cdot m_1 + 3 \cdot z_2 \cdot x_2 \cdot x_1^2 + x_2 \cdot m_2 \cdot x_1^3 - z_2 \cdot x_1^3}{x_2^3 - 3 \cdot x_1 \cdot x_2^2 + 3 \cdot x_2 \cdot x_1^2 - x_1^3}$$

$$a_2 = \frac{x_2^3 \cdot m_1 + x_2^2 \cdot x_1 \cdot m_1 + 2 \cdot x_2^2 \cdot m_2 \cdot x_1 - m_2 \cdot x_2 \cdot x_1^2 - 2 \cdot x_1^2 \cdot x_2 \cdot m_1 - 6 \cdot z_2 \cdot x_2 \cdot x_1 + 6 \cdot x_2 \cdot z_2 \cdot x_1 - m_2 \cdot x_1^3}{x_2^3 - 3 \cdot x_1 \cdot x_2^2 + 3 \cdot x_2 \cdot x_1^2 - x_1^3}$$

$$a_3 = \frac{-2 \cdot x_2^2 \cdot m_1 - x_2^2 \cdot m_2 + 3 \cdot z_2 \cdot x_2 - 3 \cdot z_1 \cdot x_2 + x_1 \cdot x_2 \cdot m_1 - x_2 \cdot m_2 \cdot x_1 + 2 \cdot x_1^2 \cdot m_2 + 3 \cdot z_2 \cdot x_1 - 3 \cdot z_1 \cdot x_1 + x_1^2 \cdot m_1}{(x_2 - x_1) \cdot (x_2^2 - 2 \cdot x_1 \cdot x_2 + x_1^2)}$$

$$a_4 = \frac{x_2 \cdot m_1 + x_2 \cdot m_2 + 2 \cdot z_1 - x_1 \cdot m_2 - x_1 \cdot m_1 - 2 \cdot z_2}{x_2^3 - 3 \cdot x_1 \cdot x_2^2 + 3 \cdot x_2 \cdot x_1^2 - x_1^3}.$$

13. A system for making an optical lens having a non-rotationally symmetric surface, comprising:
- a device cooperatively engageable with an optical element having a surface intended to be altered to provide an optical aberration correction, said device being suitable for altering the surface of the optical element upon an executable instruction;
- a control system operatively associated with the device and adapted to receive a medium including the instruction and to provide the instruction to the device for execution; and
- a medium including the executable instruction suitable for reading by the control system and for execution of the instruction by the device, wherein the instruction instructs the device to make a smooth and continuous blend zone surface profile between a first cross sectional surface profile of the non-rotationally symmetric surface and a radially adjacent, disparate, second cross sectional surface profile of the non-rotationally symmetric surface, wherein the blend zone surface profile is defined by a single third-order polynomial of the form $$z(x) = a_1 + a_2 \cdot x + a_3 \cdot x^2 + a_4 \cdot x^3,$$

where $z(x)$ is a sag value over the blend zone profile.

14. The system of claim 13, wherein the device is a numerically controlled lathe.

15. The system of claim 13, wherein the device is a laser.

* * * * *

UNITED STATES PATENT AND TRADEMARK OFFICE
CERTIFICATE OF CORRECTION

PATENT NO. : 6,843,563 B2
DATED : January 18, 2005
INVENTOR(S) : Gary A. Richardson It is certified that error appears in the above-identified patent and that said Letters Patent is hereby corrected as shown below:

Column 7,
Line 4, replace "correctible" with -- corrective --.

Signed and Sealed this

Twenty-third Day of August, 2005

JON W. DUDAS
*Director of the United States Patent and Trademark Office*